US011358597B2

(12) United States Patent
Elflein et al.

(10) Patent No.: US 11,358,597 B2
(45) Date of Patent: Jun. 14, 2022

(54) DRIVE CONTROL SYSTEM FOR A MOTOR VEHICLE WHICH CAN BE OPERATED BY ELECTRIC MOTOR AND HAS A DRIVE POSITION SELECTOR DEVICE

(71) Applicant: Bayerische Motoren Werke Aktiengesellschaft, Munich (DE)

(72) Inventors: Johannes Elflein, Munich (DE); Werner Foag, Munich (DE); Andreas Rank, Olching (DE); Florian Schnappauf, Hattenhofen (DE); Benjamin Sprengart, Unterschleissheim (DE); Philipp Wojta, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 119 days.

(21) Appl. No.: 16/754,643

(22) PCT Filed: Dec. 13, 2018

(86) PCT No.: PCT/EP2018/084679
§ 371 (c)(1),
(2) Date: Apr. 8, 2020

(87) PCT Pub. No.: WO2019/115668
PCT Pub. Date: Jun. 20, 2019

(65) Prior Publication Data
US 2020/0355265 A1 Nov. 12, 2020

(30) Foreign Application Priority Data
Dec. 14, 2017 (DE) ................. 10 2017 222 819.9

(51) Int. Cl.
*B60W 30/18* (2012.01)
*B60L 15/20* (2006.01)
*B60W 30/182* (2020.01)

(52) U.S. Cl.
CPC .... *B60W 30/18118* (2013.01); *B60L 15/2063* (2013.01); *B60W 30/182* (2013.01);
(Continued)

(58) Field of Classification Search
CPC .......... B60L 15/2063; B60L 2260/26; B60W 30/18063; B60W 30/18072; B60W 30/18118; B60W 30/18127; B60W 30/182; B60W 2540/215
See application file for complete search history.

(56) References Cited

U.S. PATENT DOCUMENTS

| 9,944,200 B2* | 4/2018 | Ochocinski ......... B60L 15/2063 |
| 11,084,498 B2* | 8/2021 | Kwon ................. B60W 30/188 |
| 2019/0106103 A1* | 4/2019 | Inoue .................... B60W 50/16 |

FOREIGN PATENT DOCUMENTS

DE 10 2005 058 829 A1 6/2007
DE 10 2007 035 424 A1 1/2009
(Continued)

OTHER PUBLICATIONS

German-language Search Report issued in German Application No. 10 2017 222 819.9 dated Jul. 30, 2018 with partial English translation (12 pages).
(Continued)

*Primary Examiner* — Erin D Bishop
(74) *Attorney, Agent, or Firm* — Crowell & Moring LLP

(57) ABSTRACT

A drive control system for a motor vehicle operated by electric motor has a drive position selector device and an electronic control unit which is connected to the drive position selector. The drive control system is configured in such a way that when a first alternative automatic drive position is selected a comparatively high, not freely select-
(Continued)

able recuperation level can be predefined and crawl mode is deactivated, and when a second alternative automatic drive position is selected at least one constant recuperation level or a sailing mode can be predefined and crawl mode is activated.

12 Claims, 4 Drawing Sheets

(52) U.S. Cl.
CPC ............... *B60W 30/18063* (2013.01); *B60W 30/18072* (2013.01); *B60W 30/18127* (2013.01); *B60L 2260/22* (2013.01); *B60L 2260/26* (2013.01); *B60W 2540/215* (2020.02)

(56) References Cited

FOREIGN PATENT DOCUMENTS

| DE | 10 2010 004 846 A1 | 3/2011 |
|----|--------------------|--------|
| DE | 10 2012 223 867 A1 | 6/2014 |
| DE | 10 2012 223 866 A1 | 7/2014 |
| DE | 10 2013 211 716 A1 | 12/2014 |
| WO | WO 2015/067867 A2  | 5/2015 |

OTHER PUBLICATIONS

International Search Report (PCT/ISA/210) issued in PCT Application No. PCT/EP2018/084679 dated Apr. 23, 2019 with English translation (seven (7) pages).
German-language Written Opinion (PCT/ISA/237) issued in PCT Application No. PCT/EP2018/084679 dated Apr. 23, 2019 (six (6) pages).
Anonymous, "2018 Nissan Leaf Owner's Manual," Nov. 2, 2017, Retrieved from the Internet on Apr. 11, 2019: http://www.nissan.ca/content/dam/nissan/ca/owners/manuals/LEAF/2018-Nissan-LEAF.pdf, XP055580169 (578 pages).
Anonymous, "Berganfahrassistent Oder Defekt?—Leaf ZE1—Antrieb, Elektromotor—Nissan Leaf ZE1—Elektroauto Forum," Nov. 8, 2018, Retrieved from the Internet on Apr. 11, 2019: https://www.goingelectric.de/forum/viewtopic.pbp/f-136&t=36041, XP055580212 (six (6) pages).

\* cited by examiner

DRIVE CONTROL SYSTEM FOR A MOTOR VEHICLE WHICH CAN BE OPERATED BY ELECTRIC MOTOR AND HAS A DRIVE POSITION SELECTOR DEVICE

BACKGROUND AND SUMMARY OF THE INVENTION

The invention relates to a drive control system for a motor vehicle which can be operated by an electric motor and has a drive position selector device and an electronic accelerator pedal.

The so-called "one-pedal feeling" with an electronic accelerator pedal in electric vehicles, which in particular is a characteristic feature of the BMW i3, ensures that when the accelerator pedal is released, there is a sharp, spontaneously meterable deceleration until the vehicle is virtually at a standstill. Furthermore, with the "Nissan Leaf", Nissan announced an e-pedal similar to the BMW i3 (electrive.net, 07.20.2017).

Various recuperation methods for the braking of electric vehicles are known, for example from DE 10 2010 004 846 A1, DE 10 2013 211 716 A1 and DE 10 2005 058 829 A1.

The invention is based on the object of further improving the establishment of a recuperation behavior in electric drives.

The invention relates to a drive control system for a motor vehicle which can be operated by an electric motor and has a drive position selector device and an electronic control unit, which is connected to the drive position selector device and is configured in such a way that when a first alternative automatic drive position is selected, a comparatively high, not freely selectable, recuperation level (preferably the maximum possible recuperation level) can be predefined and crawl mode is deactivated, and in that when a second alternative automatic drive position is selected, at least one fixed recuperation level or coasting operation can be predefined and crawl mode is activated.

When the first alternative automatic drive position is selected, in a development of the invention at least one comparatively high recuperation level can be selected and, when the second alternative automatic drive position is selected, at least one comparatively low recuperation level can be selected, in such a way that the recuperation level in the second alternative automatic function is always equal to or lower than the recuperation level in the first alternative automatic function.

The drive position selector device for selecting the first alternative automatic drive position or the second alternative automatic drive position is preferably a selector lever which, for this purpose, has a self-resetting shift key or a manually reversible changeover switch.

When the first alternative automatic drive position is selected, the vehicle is preferably always prevented from rolling away when at a standstill, even without actuation of the accelerator pedal and the brake pedal. In the presence of a controllable (therefore manually activatable and deactivatable) automatic holding function ("Auto-H"), when the vehicle has changed from driving operation to a standstill, the switching state of the holding function is disregarded. In other words, the vehicle is prevented from rolling away when at a standstill both when the holding function is activated and when the holding function is deactivated. When the first alternative automatic drive position is selected when the vehicle is at a standstill, a standstill management function for preventing unintended rolling away is activated, by which driving onward is permitted only after activation of a brake pedal and/or an accelerator pedal.

When the second alternative automatic drive position is selected, the vehicle is always prevented from rolling backward when at a standstill, even without actuation of the accelerator pedal and of the brake pedal, but rolling forward is permitted. In the presence of the aforementioned controllable holding function (Auto-H), the vehicle is always prevented from rolling backward when at a standstill (therefore both when the holding function is activated and when the holding function is deactivated), even without actuation of the accelerator pedal and of the brake pedal. However, rolling forward is permitted only when the holding function (Auto-H) is deactivated.

The invention is based on the following considerations.

Overrun recuperation for energy recovery can be establishable in many stages, permanently or according to the situation.

In vehicles with an internal combustion engine drive, when the accelerator pedal is released, there is likewise a deceleration but a noticeably lower deceleration than in the above-mentioned electric vehicles. This deceleration changes to so-called crawl speed during slow travel, which permits driving at walking pace without actuating the accelerator pedal. Craw mode or crawling is helpful in particular during maneuvering and parking. In order to prevent rolling, for example in stop and go traffic or on declines, the so-called Auto-HOLD function from BMW helps. This function corresponds to an automatic hold function ("Auto-H") which can be controlled for example via an operating element when the vehicle has changed from driving operation to a standstill.

The one-pedal feeling needs to be gotten used to. The need to continue to use the brake pedal is widespread. In addition, although it is advantageous in the city, in long distances on the freeway it is exhausting to hold the accelerator pedal in order to prevent the intense deceleration.

The object of the invention is, by means of the introduction of a novel, additional drive position, here called "i", which can be selected in automatic transmission vehicles as an alternative to the usual drive position "D" in a vehicle that can be operated by an electric motor, to combine the advantages of the driving mode of a vehicle with an internal combustion engine and of an electric vehicle with one-pedal feeling (like the BMW i3) and to allow the customer to decide which driving mode is preferably to be used.

In this new drive position ("i"), crawling is substantially always deactivated and the recuperation level is high, preferably at a maximum, and cannot be selected freely. The inadvertent rolling away of the vehicle when at a standstill is prevented by an always active secure hold. The Auto-HOLD key is retained for the drive position D, in order to prevent crawling manually if necessary. For the configuration of the recuperation in drive position "D", the recuperation stage, if appropriate including SRA (Coasting Recuperation Assistant) can preferably be configured as desired by the driver, for example by a display operating unit (e.g. iDrive from BMW). The driver has, for example, the choice between the SRA and a preferred recuperation level that can be set in multiple stages (e.g. high/medium/low). With the SRA (e.g. with camera, radar and navigation data), the vehicle automatically selects the correct overrun deceleration, depending on the traffic situation.

The term "alternative automatic drive position" is understood to mean both a drive position with self-changing transmission and also with a fixed transmission ratio.

The invention brings the following advantages:
- added customer value
- combination of multiple drive characteristics when under electric drive
- driver can change between two drive characteristics on the basis of the situation
- recuperation level can be set flexibly
- simple operation
- always secure holding in drive position "I" without brake actuation Exemplary embodiments of the invention are illustrated in the drawings and will be described in more detail below.

DETAILED DESCRIPTION OF THE DRAWINGS

Figure 1:
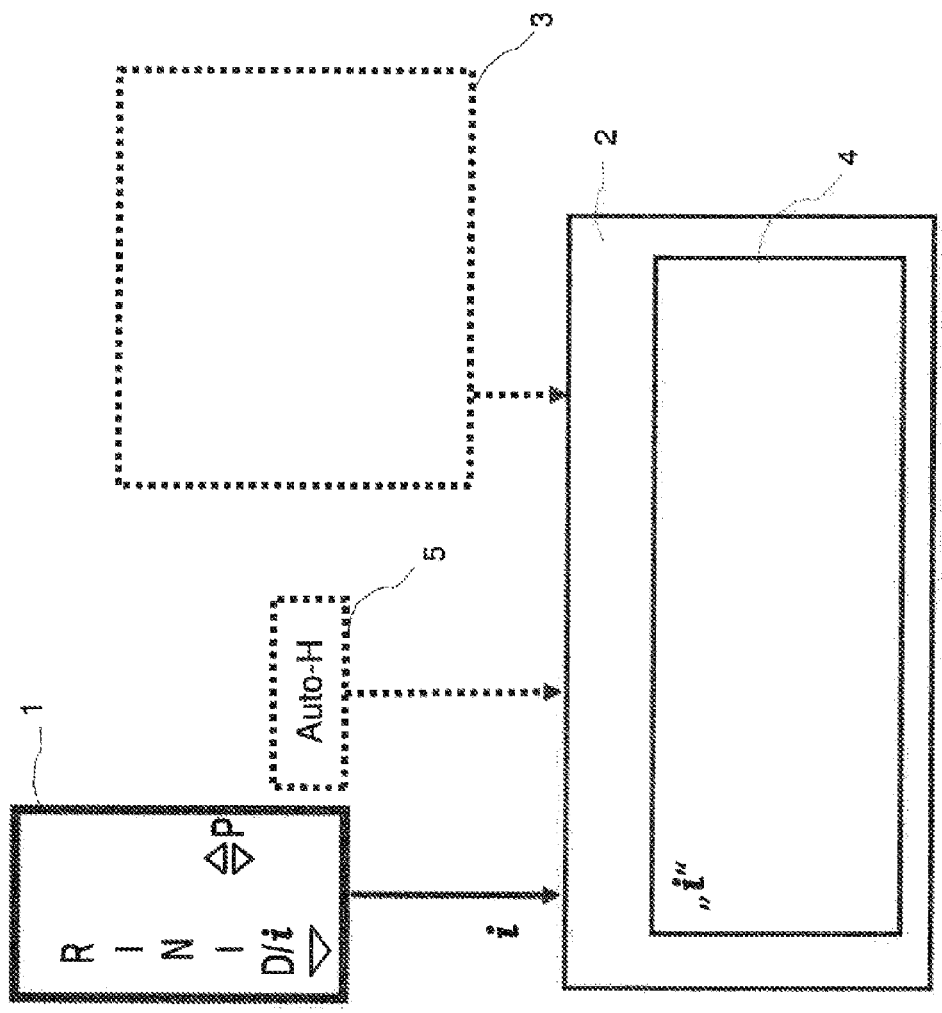
FIG. 1 is a schematic illustration of an overview of the important components of the drive system according to an embodiment of the invention with the first drive position selected.
Figure 2:
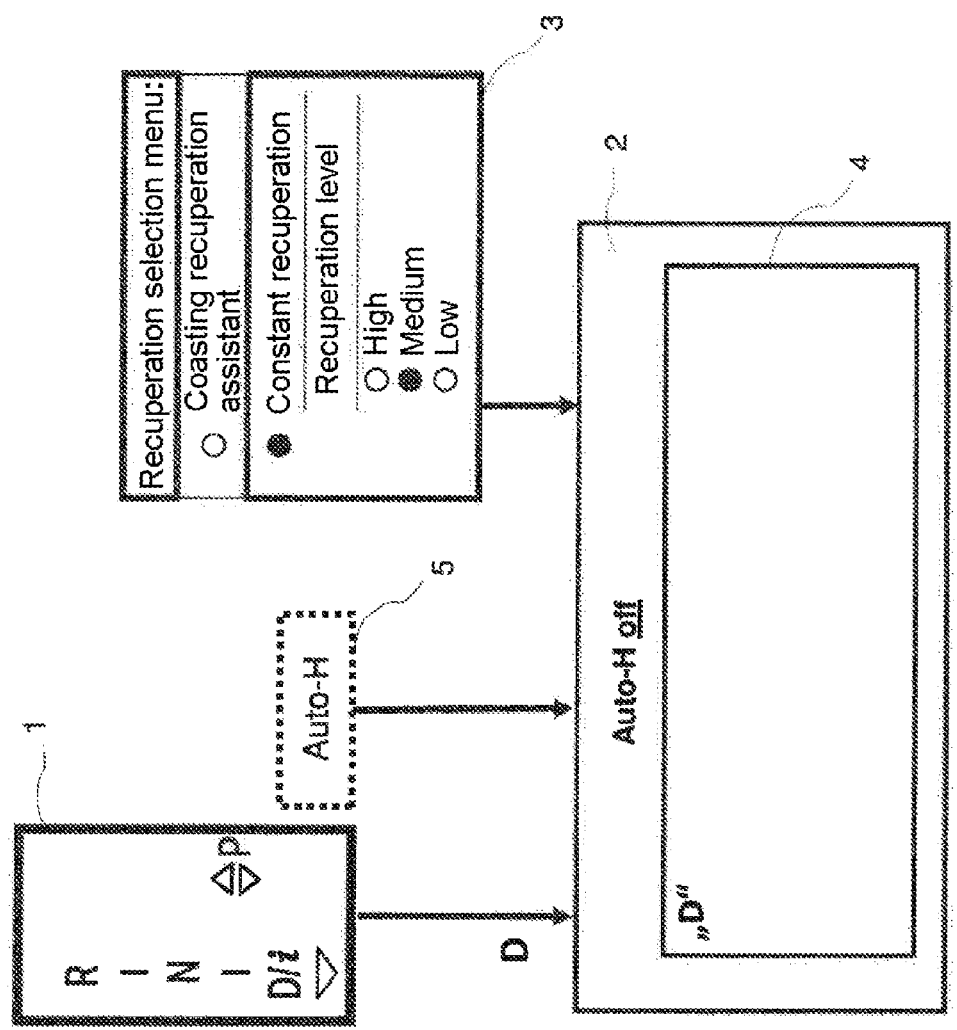
FIG. 2 is a schematic illustration of an overview of the important components of the drive system with the second drive position selected.
Figure 3:
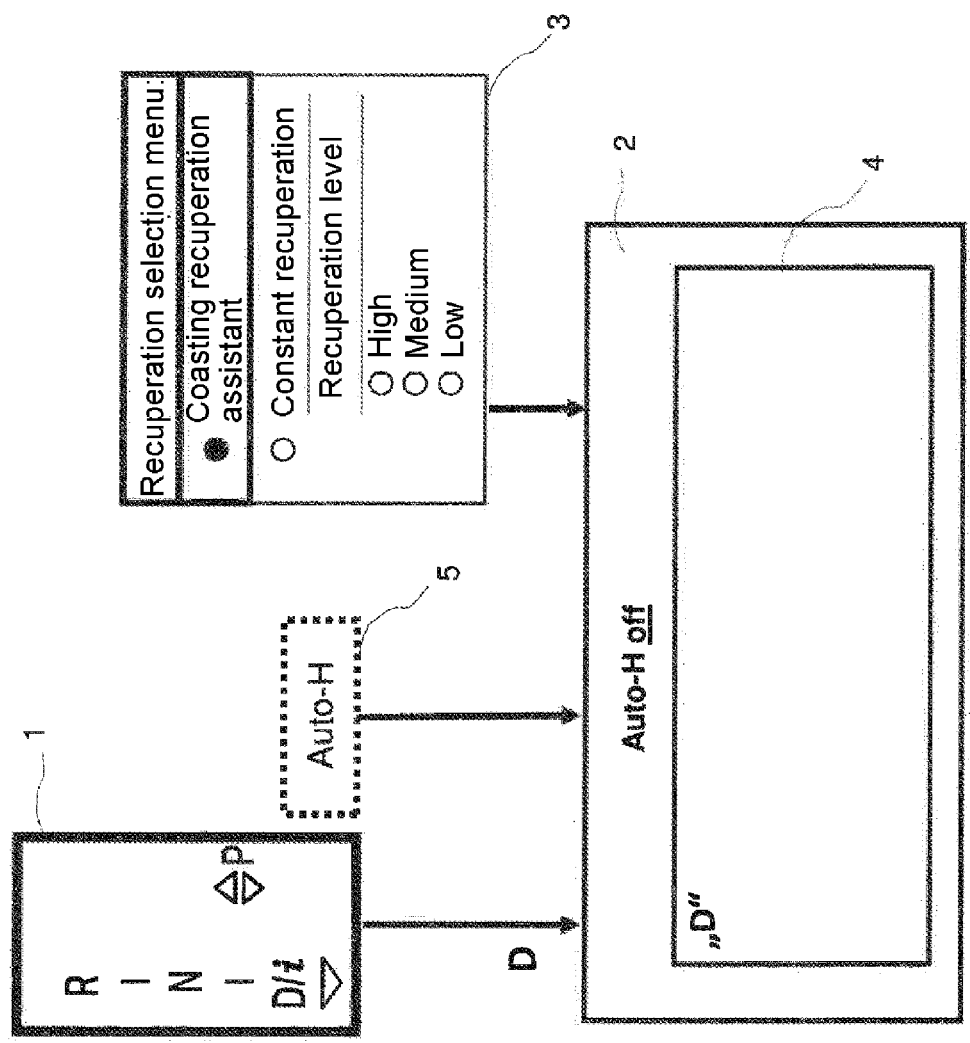
FIG. 3 is a schematic illustration of an overview of the important components of the drive system with the second drive position and optionally SRA selected.

In FIGS. 1 to 3, a drive control system for a motor vehicle which can be operated by an electric motor and has an electronic control unit 2 is illustrated, the latter being connected to a drive position selector device in the form of a drive position selector lever 1, having a display operating unit 3 and having an auto-hold key 5 for activating and deactivating the aforementioned holding function (Auto-H).

The electronic control unit 2 is in particular equipped by means of an appropriately programmed software module 4 in such a way that, in principle, when a first alternative automatic drive position "i" is selected, when the accelerator pedal is released, a comparatively high (preferably maximum) recuperation level is set and crawling is deactivated (FIG. 1) and that when a second alternative automatic drive position "D" is selected, when the accelerator pedal is released, at least one selectable fixed recuperation level or an (in particular auto-adaptive) coasting operation is predefinable and crawling is activated (FIG. 2 or FIG. 3). Preferably, in the second alternative automatic drive position "D", only one recuperation level can be selected, which is equal to or lower than the recuperation level predefined in the first alternative automatic drive position "i".

More precisely, the software module 4 in the control unit 2 preferably carries out the following functions, depending on the signals from the drive position selector device, here in the form of a drive position selector lever 1, in accordance with a predefined switching scheme, here: R-N-"D" or alternatively "i", the display operating unit 3 and/or the auto-hold key 5:

When the first drive position "i" is selected (FIG. 1):
Crawling is always deactivated and the recuperation level is higher than the highest recuperation level or equal to the highest recuperation level in the second drive position "D". If there is an auto-hold key "Auto-H", irrespective of the actuation of this key, the vehicle is always prevented from rolling away when at a standstill when the accelerator pedal is released.

With the alternative selection of the second drive position "D" (FIG. 2 and FIG. 3):
Crawling is always activated and the recuperation level is at most as high as the recuperation level in the first drive position "i".
The auto-hold key "Auto-H" can be retained. If the Auto-H function is activated, for example via the key, the vehicle will automatically be held against rolling forward and backward as usual when a standstill is reached. Crawling is then suppressed. If the Auto-H function is deactivated, for example via the key, or the function is not present at all, the vehicle will automatically be held only against rolling backward when a standstill is reached. Crawling will not be suppressed.

When a reverse drive position "R" is selected, this function is carried out in an analogous way: If the Auto-H function is deactivated, for example via the key, or the function is not present at all, the vehicle will be held automatically only against rolling forward when a standstill is reached. Crawling will not be suppressed.

For the configuration of the recuperation in drive position "D", the recuperation stage, if appropriate including SRA (Coasting Recuperation Assistant), can preferably be configured by the driver, for example via a display operating unit 3. The driver has, for example, the choice between the coasting recuperation assistant SRA (FIG. 3) or a preferred, fixedly settable recuperation level (here, for example, high/medium/low; FIG. 2). With the SRA (via camera, radar and navigation data), the vehicle automatically selects the correct overrun deceleration, depending on the traffic situation.

The invention therefore relates, within the context of an electric drive, either to a one-pedal feeling (A) or the driving feel (B) of an internal combustion engine vehicle with automatic transmission and Auto-H function:

A)
1. sharp deceleration when the accelerator pedal is released
2. no crawling, deceleration down to a standstill or at least to virtually at a standstill
   no Auto-H (necessary), always secure hold at a standstill, even without actuation of the brake pedal B)
1. low deceleration when the accelerator pedal is released
2. crawling, deceleration as far as to crawl speed
   auto-H to secure against rolling away when at a standstill and suppression of the crawling torque, wherein when Auto-H is deactivated, the vehicle is prevented from rolling away only in the respective direction opposite to the preceding direction of travel.

Figure 4:
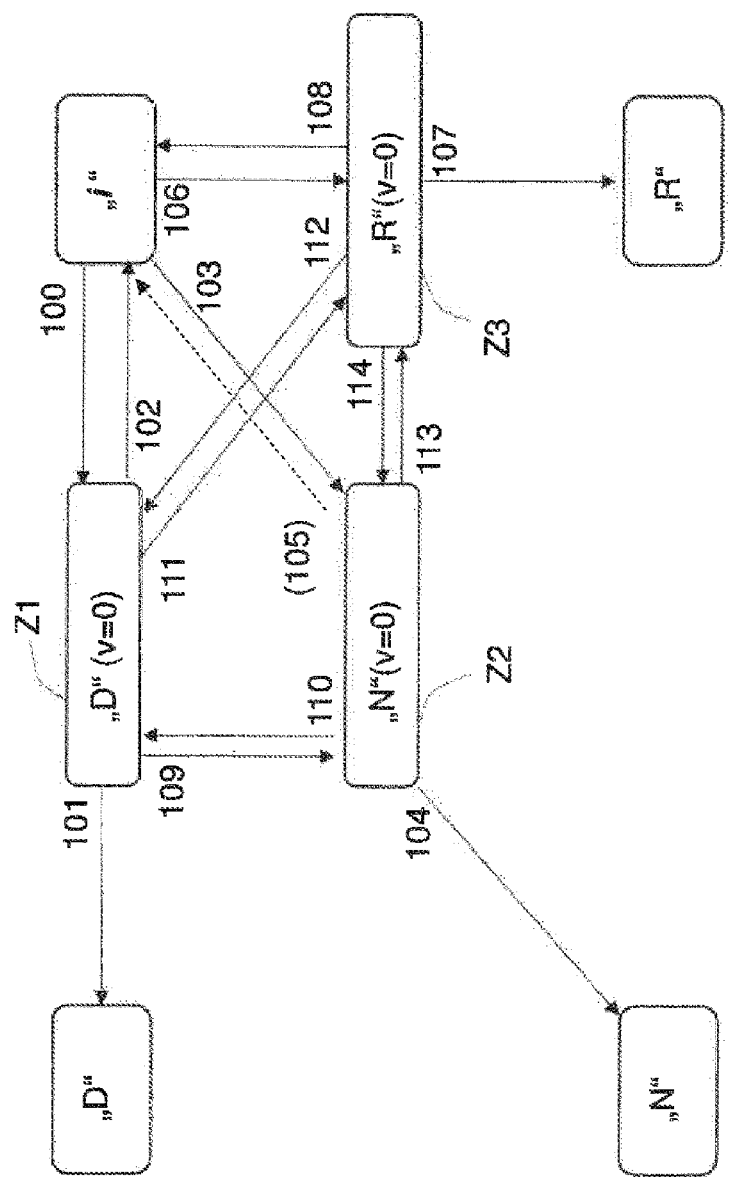
FIG. 4 is a state diagram for possible changes of the drive position-dependent functions, starting from a standstill.

FIG. 4 illustrates, schematically, functional changes for preventing undesired rolling away. Relevant here are changes from intermediate states Z1 to Z3 when at a standstill (v=0) (Standstill Management Function).

The intermediate state Z1 is functionally a holding state associated with the second drive position "D". The intermediate state Z2 is functionally a holding state associated with the neutral position "N". The intermediate state Z3 is functionally a holding state associated with the reverse gear "R".

If a standstill (v=0) has been reached in the drive position "i" and the driver then selects the drive position "D" with step 100 without actuating the brake pedal, the vehicle is initially held in an intermediate state Z1 for safety reasons until the accelerator pedal or the brake pedal is actuated according to step 101. After that, crawling is activated in drive position D.

If, in the intermediate state Z1, a change back to drive position "i" again is made with following step 102, it is possible to drive on in drive position "i" with actuation of the accelerator pedal.

If a standstill (v=0) has been reached in the drive position "I" and the driver then selects the drive position "N" with step 103, the vehicle is initially held in an intermediate state Z2 for safety reasons until the brake pedal is actuated according to step 104. After that, a change can be made to a usual operation associated with the drive position "N".

(Path 105 is currently not provided.)

If, in the intermediate state Z2, the brake is touched briefly, free rolling is thereafter permitted.

If a standstill (v=0) has been reached in drive position "i" and the driver then selects drive position "R" with step 106 without actuating the brake pedal, the vehicle is initially held in an intermediate state Z3 for safety reasons until the accelerator pedal or the brake pedal is actuated according to step 107. After that, crawling is activated in drive position R.

If, in the intermediate state Z3, a change back to drive position "i" again is made with following step 106, it is possible to drive on in drive position "i" with actuation of the accelerator pedal.

If, in the intermediate state Z1, drive position "N" is selected with step 109, a change is made to intermediate state Z2.

If, in the intermediate state Z2, drive position "D" is selected with step 110, a change is made to intermediate state Z1.

If, in the intermediate state Z1, drive position "R" is selected with step 111, a change is made to intermediate state Z3.

If, in the intermediate state Z3, drive position "D" is selected with step 112, a change is made to intermediate state Z1.

If, in the intermediate state Z2, drive position "R" is selected with step 113, a change is made to intermediate state Z3.

If, in the intermediate state Z3, drive position "N" is selected with step 114, a change is made to intermediate state Z2.

What is claimed is:

1. A drive control system for a motor vehicle operable by an electric motor, comprising:
    a drive position selector; and
    an electronic control unit which is connected to the drive position selector and is configured such that:
        when a first alternative automatic drive position is selected, a first, not freely selectable, recuperation level is predefinable and crawling is deactivated; and
        when a second alternative automatic drive position is selected, at least one fixed second recuperation level or coasting operation is predefinable and crawling is activated.

2. The drive control system according to claim 1, wherein the drive position selector for selecting the first alternative automatic drive position or the second alternative automatic drive position has a self-resetting shift key or a manually reversible changeover switch.

3. The drive control system according to claim 1, wherein when the first alternative automatic drive position is selected, the vehicle is always prevented from rolling away when at a standstill, even without actuation of an accelerator pedal and a brake pedal.

4. The drive control system according to claim 3, wherein when the second alternative automatic drive position is selected, the vehicle is always prevented from rolling backward when at a standstill, even without actuation of the accelerator pedal and of the brake pedal.

5. The drive control system according to claim 4, wherein when the second alternative automatic drive position is selected and in a presence of an operating element for a controllable automatic holding function, when a standstill is reached, independently of the actuation of the operating element, the vehicle is prevented from rolling backward when at a standstill, even without actuation of the accelerator pedal and the brake pedal, but rolling forward is permitted if the holding function is deactivated via the operating element.

6. The drive control system according to claim 4, wherein when a reverse drive position is selected and in a presence of an operating element for a controllable automatic holding function, when a standstill is reached, the vehicle is always prevented from rolling forward when at a standstill, even without actuation of the accelerator pedal and the brake pedal, but rolling backward is permitted if the holding function is deactivated via the operating element.

7. The drive control system according to claim 1, further comprising:
    a display operating unit, by which the first or the second recuperation level is defined when the second alternative automatic drive position is selected.

8. The drive control system according to claim 1, further comprising:
    a display operating unit, by which the first or the second recuperation level is defined, wherein,
        when the first alternative automatic drive position is selected, the first recuperation level is at least equal to a highest recuperation level that can be defined when the second alternative automatic drive position is selected.

9. The drive control system according to claim 1, wherein when the first alternative automatic drive position is selected when the vehicle is at a standstill, a standstill management function for preventing unintended rolling away is activated, by which driving onward is permitted only after activation of a brake pedal and/or an accelerator pedal.

10. The drive control system according to claim 1, wherein
    the first recuperation level is greater than or equal to the second recuperation level.

11. A computer product comprising a non-transitory computer readable medium having stored thereon program code that, when executed by an electronic control unit, controls a drive control system of a vehicle having a drive position selector
    when a first alternative automatic drive position is selected via the drive position selector, a first, not freely selectable, recuperation level is predefinable and crawling is deactivated; and
    when a second alternative automatic drive position is selected via the drive position selector, at least one fixed second recuperation level or coasting operation is predefinable and crawling is activated.

12. The computer program product according to claim 11, wherein
    the first recuperation level is greater than or equal to the second recuperation level.

* * * * *